(12) United States Patent
Collister et al.

(10) Patent No.: US 6,450,555 B1
(45) Date of Patent: Sep. 17, 2002

(54) LOCKING SQUEEZE-OFF CLAMP

(75) Inventors: Richard L Collister, Frenchtown; Kenneth H. Green, Whitefish, both of MT (US)

(73) Assignee: Timberline Tool and Casting, Inc., Whitefish, MT (US)

(*) Notice: Subject to any disclaimer, the term of this patent is extended or adjusted under 35 U.S.C. 154(b) by 0 days.

(21) Appl. No.: 09/423,953

(22) PCT Filed: May 15, 1998

(86) PCT No.: PCT/US98/09916

§ 371 (c)(1),
(2), (4) Date: Nov. 16, 1999

(87) PCT Pub. No.: WO98/51894

PCT Pub. Date: Nov. 19, 1998

(51) Int. Cl.[7] ................................................. E05C 3/04
(52) U.S. Cl. ............................ 292/210; 251/9; 81/318
(58) Field of Search .................... 292/210, 98, 108, 292/132, 134, 181, 197, 200, 224, 256, 297; 81/318, 319, 320, 324, 329, 331, 322, 323; 269/90, 204, 207–209, 214, 215, 211, 238; 251/9

(56) References Cited

U.S. PATENT DOCUMENTS

| | | |
|---|---|---|
| 493,159 A | 3/1893 | Gibson |
| 986,593 A | 3/1911 | Roisum |
| 1,463,622 A | 7/1923 | Lummer |
| 1,877,768 A | 9/1932 | Koester |
| 2,221,923 A | 11/1940 | Passauer |
| 2,595,989 A * | 5/1952 | Smeltz ...................... 43/53.5 |
| 3,460,797 A | 8/1969 | Allenbaugh, Jr. |
| 4,582,292 A | 4/1986 | Glotzback et al. |
| 5,152,497 A | 10/1992 | Bissell |
| 5,408,904 A * | 4/1995 | Neff ........................... 81/360 |

FOREIGN PATENT DOCUMENTS

| | | |
|---|---|---|
| DE | 92 16 463 U | 1/1993 |
| DE | 44 11 717 A | 10/1995 |

* cited by examiner

Primary Examiner—Gary Estremsky
(74) Attorney, Agent, or Firm—Dorsey & Whitney LLP (57) ABSTRACT

A latching mechanism (26) for an adjustable squeeze-off clamp (10) comprising a static jaw (16), a movable jaw (18) with an associated adjustment member (20) and an over-the-center operating linkage including an operating handle (23) and a link (24). The latching mechanism is selectively automatic whereby, when the lock mode is selected and the clamp is then closed, it automatically locks. The latch mechanism includes a spring (32) and a latch bar (28) with pivotal mounting (30) and notched end (36). In at least one embodiment, the latching mechanism includes an eccentric knob (42) for selection of the automatic locking mode.

12 Claims, 8 Drawing Sheets

LOCKING SQUEEZE-OFF CLAMP

BACKGROUND OF THE INVENTION

The present invention relates to clamping devices, and more particularly, to a pliers-type clamp with a lock or latch feature. Even more particularly, the present invention relates to a lock or latch feature for use with the squeeze-off clamp disclosed in U.S. Pat. No. 5,152,497 (the '497 patent), the disclosure of which patent is incorporated herein by reference.

The adjustable clamp of the present invention comprises a first jaw and handle, a second jaw movably connected to the first jaw, an operating linkage connected to the jaws, including a operating handle and a link, for moving the second jaw in response to the operation of the linkage, an adjustment mechanism associated with one of the jaws for changing the force exerted on a workpiece when the clamp is fully closed, and an automatic latch mechanism. The clamp is an over-the-center clamp, wherein the closing of the handles brings the linkage, particularly the link, over center.

The latch mechanism is operably associated with the operating linkage and provides the advantage of selectively, automatically locking the clamp closed after the clamp reaches its closed position. The latch mechanism requires a deliberate, selective choice to set it in its unlocked or nonlock mode in order to open the clamp from its closed position once it is latched, thereby preventing the inadvertent opening of the clamp.

The automatic latch mechanism of the present invention does not add undue complexity or weight to the clamp of the '497 patent.

Other features and advantages of the latching mechanism of the present invention will become more fully apparent and understood with reference to the following description and drawings.

DETAILED DESCRIPTION OF THE PREFERRED EMBODIMENT

The Figures depict the squeeze-off clamp with latching mechanism of the present invention, and features and components thereof. With regard to means for fastening, mounting, attaching or connecting the components of the present invention to form the clamp with latch mechanism as a whole, unless specifically described otherwise such means are intended to encompass conventional fasteners such as machine screws, machine threads, snap rings, rivets, nuts and bolts, toggles, pins and the like. Components may also be connected by welding or deformation, if appropriate. Unless specifically otherwise disclosed or taught, materials for making components of the present invention are selected from appropriate materials such as aluminum, steel, metallic alloys and the like, and appropriate manufacturing or production methods including casting, extruding, molding and machining may be used.

Any references to front and back, right and left, top and bottom, upper and lower, and horizontal and vertical are intended for convenience of description, not to limit the present invention or its components to any one positional or spacial orientation. Such terms are to be read and understood with their conventional meanings.

Figure 1:
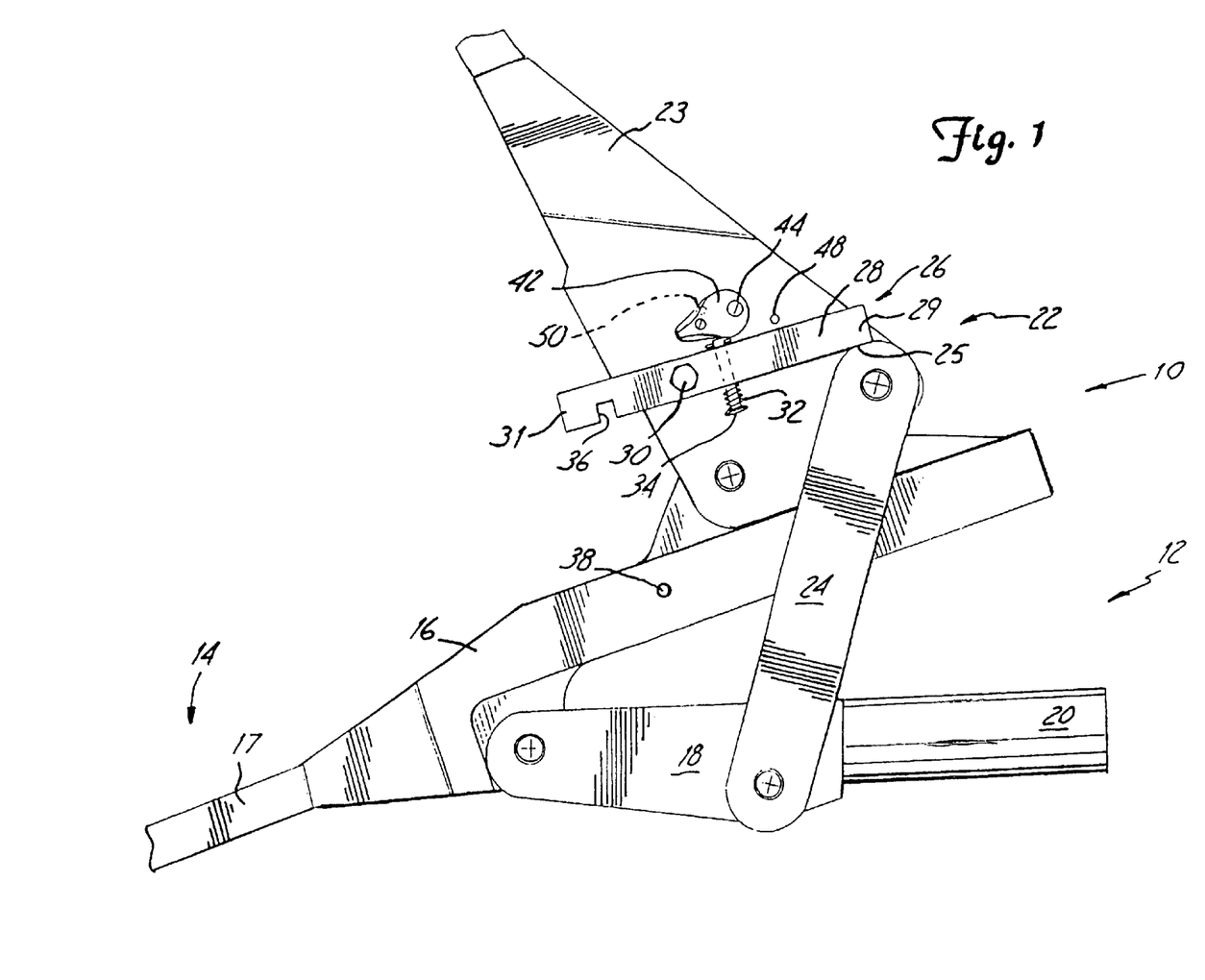
FIG. 1 is an elevation of the clamp with latching mechanism of the present invention.
Figure 2:
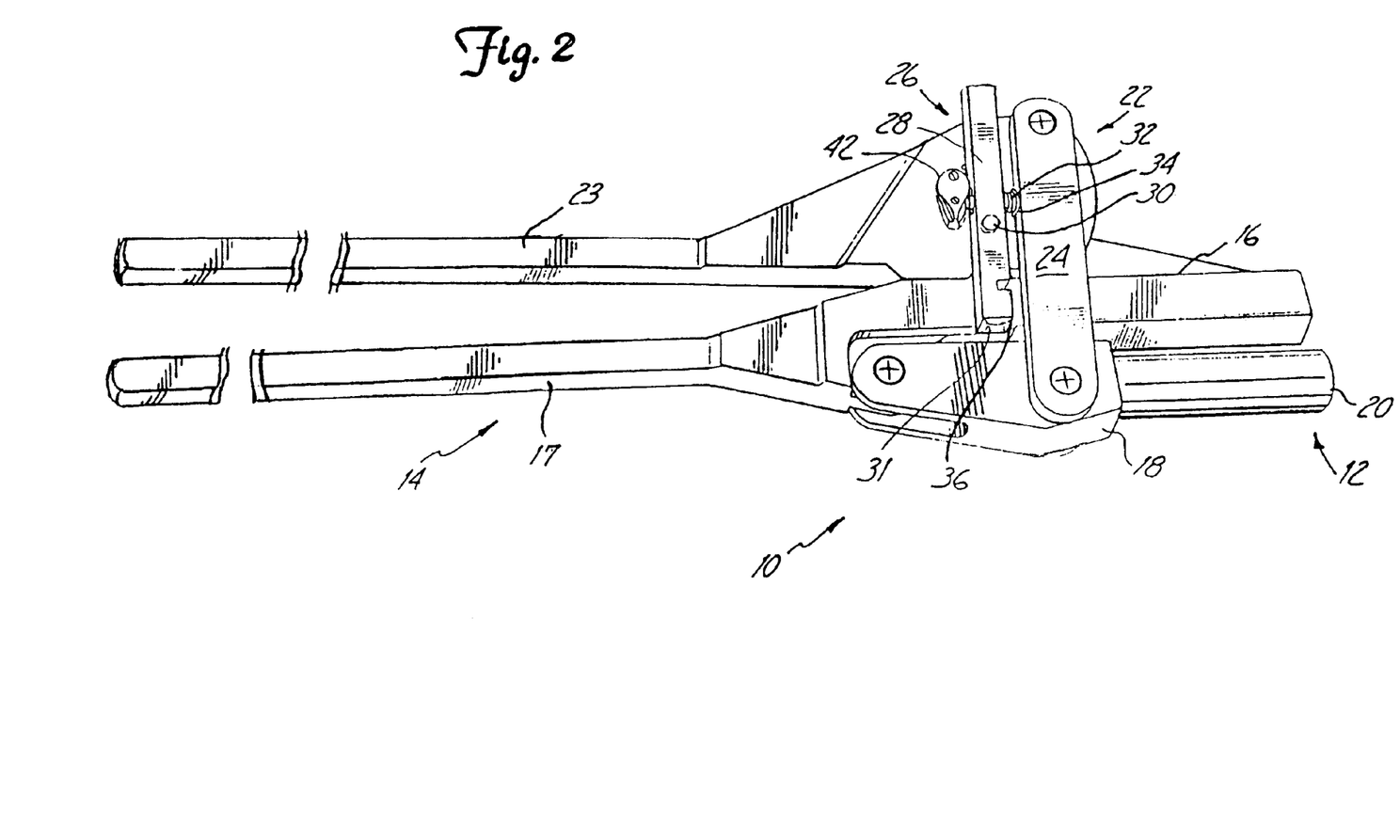
FIG. 2 is a perspective view of the present invention, with extended clamp handles for working in deep trenches or ditches.

Referring then to the Figures, particularly FIGS. 1 and 2, the clamp 10 of the present invention has a jaw or work piece gripping end 12 and a handle end 14. The clamp 10 includes a static top jaw 16 with an integral handle 17, a movable bottom jaw 18 and an operating linkage 22, including a handle 23 and a link 24, operably coupling the jaws. The bottom jaw includes a barrel-like adjustment member 20. The clamp 10 is provided with an automatic latch mechanism 26.

Referring to FIG. 1, the latch mechanism 26 is carried by the clamp top handle 23, part of the operating linkage 22. The latch mechanism includes a latch bar 28, which is pivotally pinned to the handle 23 by a pin 30. The bar 28 is an elongated, generally rectangular, solid single piece of material. Approximately mid-way along its length, adjacent to the pin 30, it carries a latch bar spring 32 held in place by a latch spring pin 34. Alternatively, the spring could be carried in a similar fashion by the link 24. Adjacent one end 31, the latch bar 28 includes a relieved notch 36 forming a latch hook for releaseably engaging an outstanding latch post 38 carried by the top jaw 16.

Figures 6, 7:
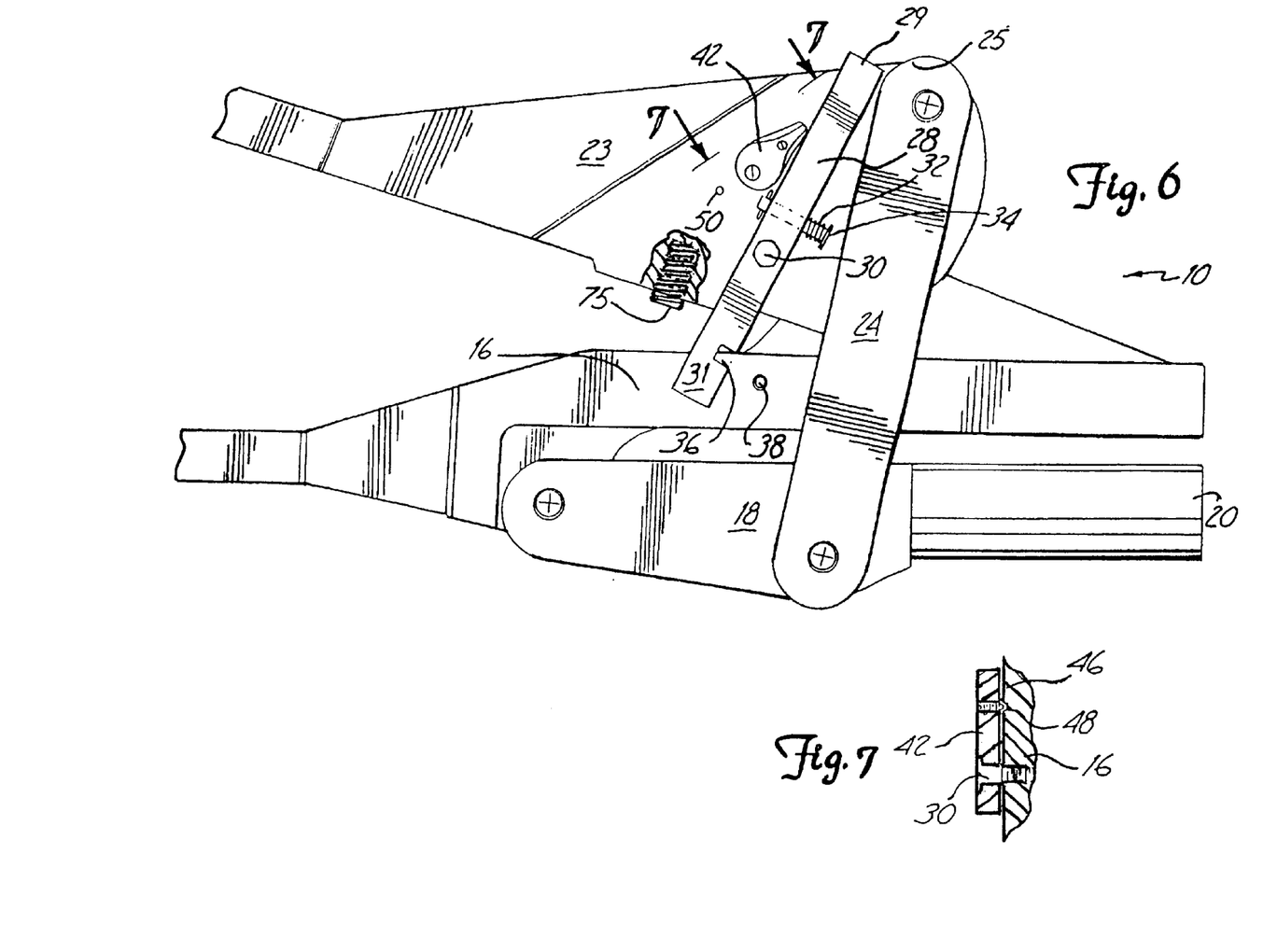
FIG. 6 is an elevational view of the latch mechanism in an unlocked setting with the clamp closed, but unlocked.
FIG. 7 is a sectional view taken along line 7—7 of FIG. 6.

The latch mechanism 26 also includes a function and indicator operating knob 42 which is pinned to the handle 23 by a pin 44. Referring to FIG. 7, the knob 42 houses a spring biased pin 47 (FIG. 7) which extends from the underside thereof and selectively lodges or is received in one of the latch detents 48, 50 depending on the selected position of the knob 42. The knob 42 pivots around the pin 44 and is held in either the locked or unlocked position by the engagement of the knob spring pin 47 with one of the detents 48, 50, depending upon the position of the knob 42. This causes the knob 42 to be held in the appropriate position for the mode of clamp operation as explained below.

Figures 8, 9:
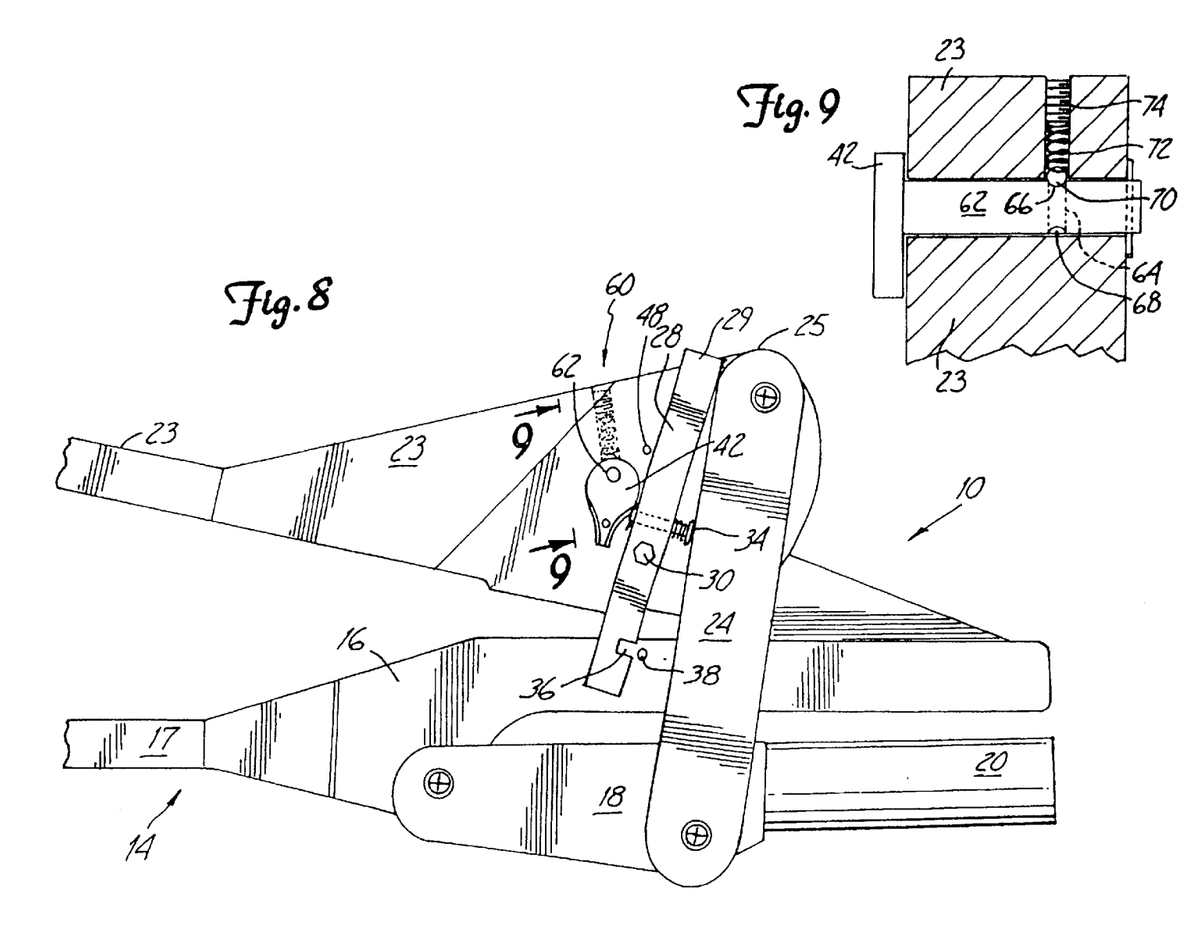
FIG. 8 is an elevational view depicting another embodiment of the present invention, wherein a spring-loaded ball/detent arrangement is carried in a handle for setting the clamp in its locked and unlocked modes.
FIG. 9 is a sectional view taken along line 9—9 of FIG. 8.

FIG. 8 depicts another embodiment of the present invention, wherein a spring-loaded ball/detent arrangement 60 is carried in handle 23 for setting the clamp in its locked and unlocked modes. Referring to FIG. 9, the pin 44 for the knob 42 is replaced by a shaft 62. The shaft 62 may be integral with the knob 42 or the knob may be fixed to the shaft. The shaft 62 includes a detent bore 64 to provide two detents 66, 68, 180 degrees apart on the shaft, one for holding the knob 42 in its locked setting and the other for holding the knob 42 in its unlock setting. The handle 23 is bored to receive a ball 70, spring 72 and set screw 74. Two superficial detents (not shown) may be used on the shaft 62 rather than a throughbore.

Another alternative feature of the present invention is depicted in FIG. 6. One of the handles 17, 23, in the depicted instance handle 23, includes a threaded bore for receiving a set screw 75 for adjusting the clamp closure and over-the-center locking by adjusting or varying the amount the handles can be brought together. The further the screw 75 is screwed in, the closer together the handles 17, 23 can come, and the farther over-the-center the link 24 can be moved, and the converse. This feature provides a fine tuning of the degree of over-the-center travel in the linkage, particularly of the link 24.

The operation of the latching mechanism 26 of the present invention can be appreciated by consideration of the remaining drawings which depict the present invention in various operational settings or positions. Referring to FIG. 1, the jaws of the clamp 10 are depicted in a nearly fully open position with the locking knob 42 in its lock setting. In this position, the latch bar 28 is free to pivot about the pin 30 holding it to the handle 23. The length of the latch bar 28 is specifically chosen to permit the upper region 29 of the bar to contact or ride against the end curved portion 25 of the link 24, and to prevent it from rotating or falling downwardly against the side of the link 24 which would cause the clamp 10 to jam in the open position.

Figure 3:
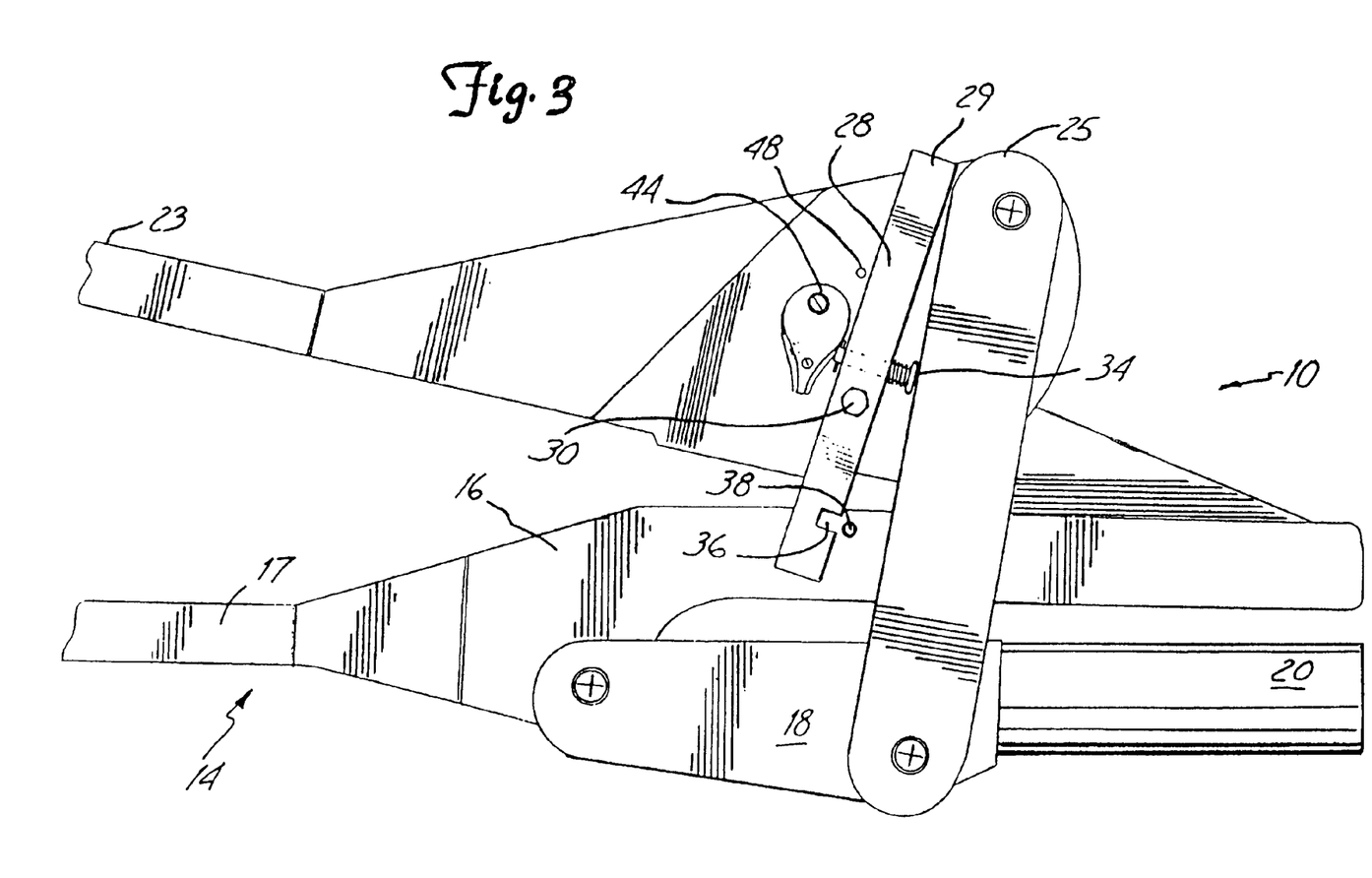
FIG. 3 is an elevational view of the present invention, particularly the latch mechanism, in one functional position.

As the handles 17, 23 are moved toward each other, the jaws 16, 18 close. The latch bar 28 remains free to pivot between the latch knob 42 and the link 24. The knob 42 is specifically located on the operating handle 23 to prevent the bar 28 from pivoting into position in which the bottom end 31 could jam against the post 38. Referring to FIG. 3, the latch mechanism 26 is still in the lock setting and the clamp handles are almost closed. As the handles are brought together, the bottom end or region 31 of the latch bar 28 is free to pivot into a position in which the lower portion of the bar 28 between the end 31 and the notch 36 rides smoothly against the latch post 38 as the handles close. Even in the position depicted in FIG. 3, the latch bar 28 can still pivot away from the post 38 and avoid capturing it.

Referring to FIG. 2, the latch mechanism 26 of the present invention is depicted in its locked position wherein the clamp handles 17, 23 and jaws 16, 18 are closed and locked. Note that as the top handle 23 and the bottom handle 17 are brought together and the clamp 10 enters its closed position, the side of the link 24 contacts and exerts force on the latch bar spring pin 34 and the spring 32. The spring 32 causes the latch bar 28 to pivot so that the lower portion of the latch bar 28 comes into contact against the post 38. As the handles are closed, the link 24 continues to put pressure on the spring 32, keeping the lower part of the bar 28 against the post 38. When the handles are completely closed, the bar 28 is driven sufficiently so the notch 36 receives the post 38. The latch bar 28 is held in position with the notch 36 around the post 38 due to the force created by the link 24 compressing the spring 32, thereby locking the handles together.

Figure 4:
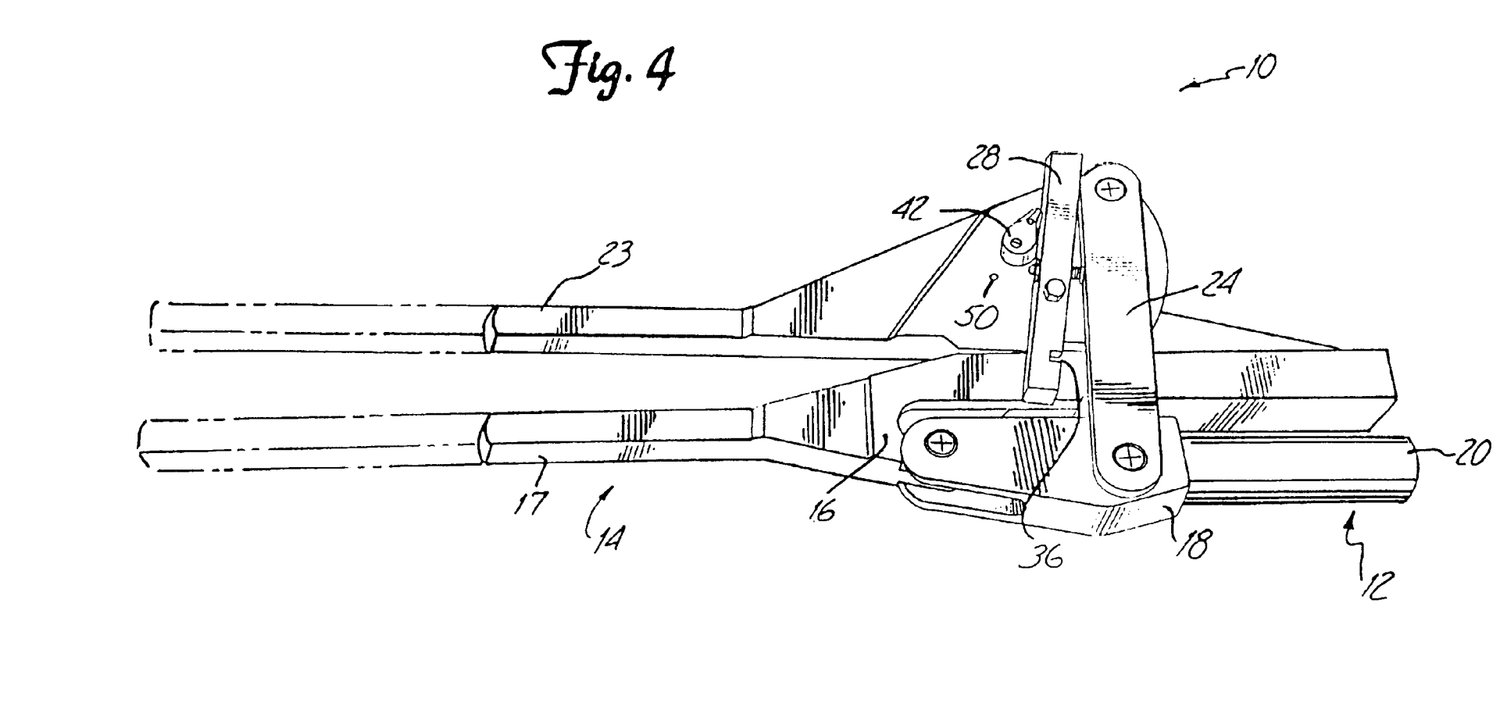
FIG. 4 is a perspective of the present invention depicting the latch mechanism in another position, namely, in an unlocked setting.
Figure 5:
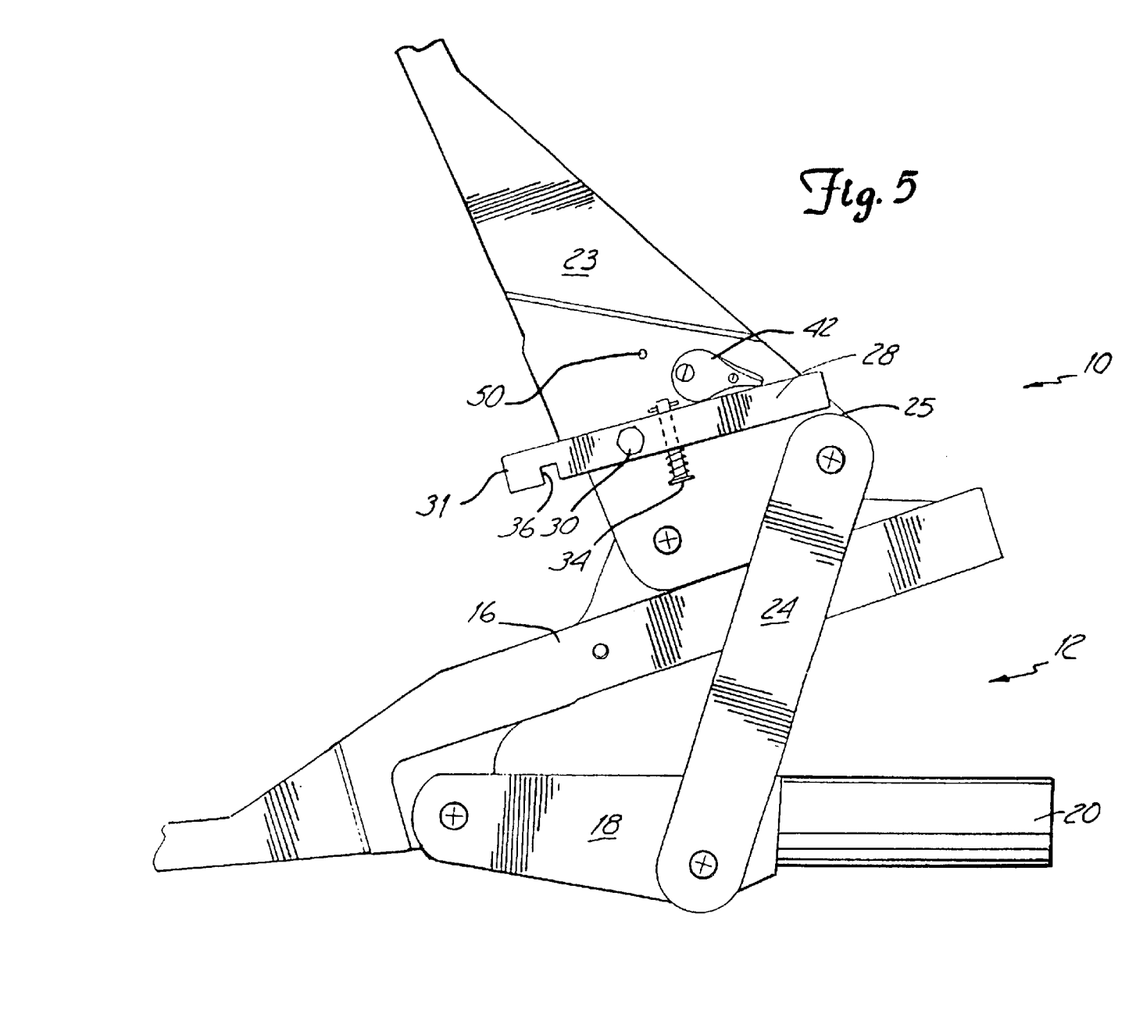
FIG. 5 depicts the latch mechanism of the present invention in an unlocked setting with the clamp open.

Referring to FIGS. 4–6, initially FIG. 6, the clamp 10 and latch mechanism 26 of the present invention is depicted in its unlocked setting with the clamp handles 17, 23 nearly closed, but unlocked in order to open the clamp 10. To open the clamp 10 (from the locked position depicted in FIG. 2), the knob 42 is rotated from its locked position to the unlocked position shown in FIG. 6. When the knob 42 is moved to the unlock position, the knob 42 bears against the upper end of the latch bar 28, further compressing the latch bar spring 32, pivoting the bar 28 and causing the notch 36 to disengage from the post 38. The handles can then be moved apart and, as they are, the link 24 moves away from the latch bar spring (i.e., from the position depicted in FIG. 4 to the position depicted in FIG. 6). When the link has moved sufficiently, the spring will no longer be compressed. The latch bar 28 remains free from the post 38 because, in its unlock position, the knob 42 prevents the bar 28 from pivoting sufficiently for the notch 36 to engage the post 38.

FIG. 5 depicts the clamp 10 in its fully open position and in an unlocked setting. The bar 28 is free to pivot in the space between the knob 42 and the upper portion 25 of the link 24.

Figure 10:
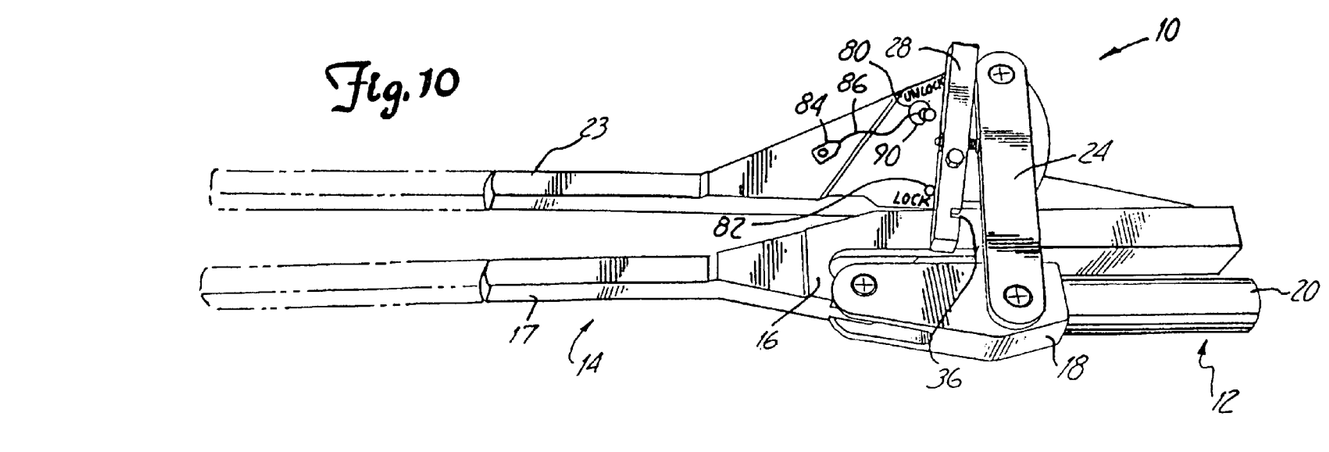
FIG. 10 is an elevational view of another embodiment of the present invention in one operational mode.
Figure 11:
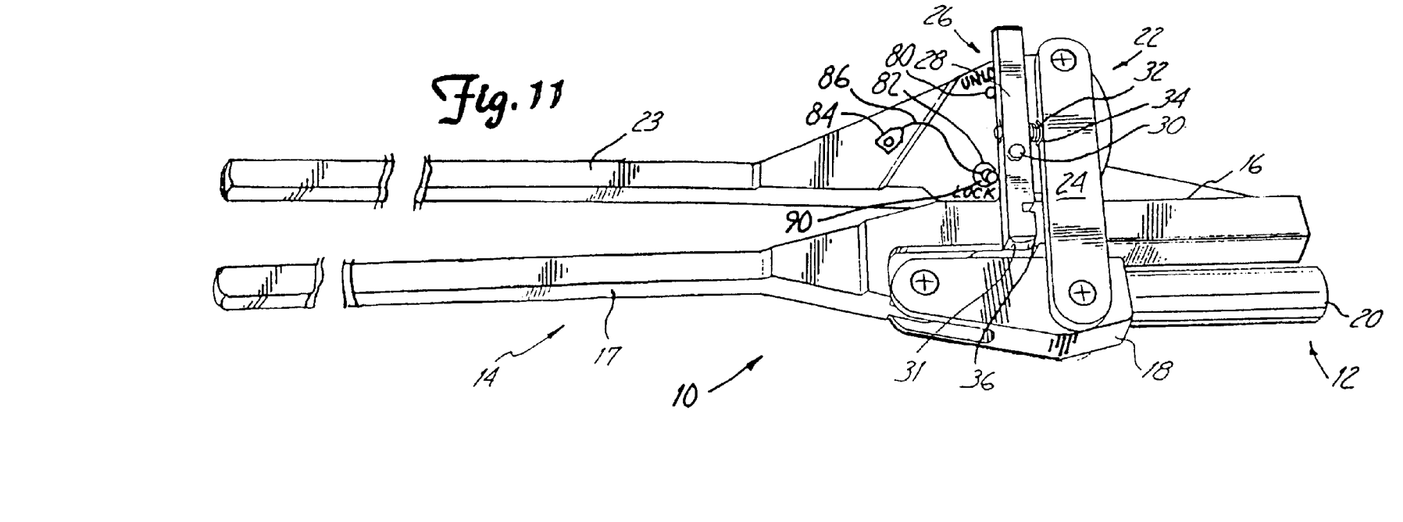
FIG. 11 is an elevational view of the embodiment depicted in FIG. 10 in another operational mode.

FIGS. 10 and 11 depict another embodiment of the present invention, wherein a pair of holes 80, 82 bored in the handle 23 adjacent to the forward end thereof, near the link 24. The handle 23 is also adapted to carry an attachment plate 84 for attaching a cord or lanyard 86 to the handle 23. The free end of the lanyard 86 carries a pin 90 for being selectively and removably received in one of the holes 80, 82. Preferably, the pin 90 is a "quick release," pin of the commercially available type which include a ball or other suitable detent feature. When the pin 90 is lodged in hole 80, as depicted in FIG. 10, the clamp 10 is in its unlocked mode, and when the pin 90 is placed in the other hole 82, the clamp 10 is in its locked mode.

The materials for forming the clamp and latching mechanism of the present invention may be as follows:

| Part | Material |
| --- | --- |
| Latch bar | 6061 T6 aluminum |
| Latch bar pin | 18-8 stainless steel |
| Latch bar spring | Type 302 stainless steel |
| Latch bar spring pin | 18-8 stainless steel |
| Latch pin | 18-8 stainless steel |
| Knob | 6061 T6 aluminum |
| Knob spring pin | stainless steel with Delrin nose |

Note that, as shown in FIGS. 2 and 4 (in phantom in FIG. 4), the clamping tool 10 may be provided in an embodiment with extended length handles for using the tool 10 on hard to reach work pieces, e.g., conduits or the like at the bottom of a trench. The handles of long-handled embodiments of the present invention may be of any selected length, as long the operating efficiency of the clamp/latch mechanism is not impaired. The latch bar 28 and knob 42 are machined or formed from stock purchased from ALCOA. The various springs and pins may be selected from commercially available items, included those available from McMaster-Carr and the knob spring pin is purchased from the Reid Tool Company.

The present invention may be embodied in other specific forms without departing from the essential spirit or attributes thereof. It is desired that the described embodiment be considered in all respects as illustrative, not restrictive.

What is claimed is:

1. A clamping tool having a latch mechanism, the latch mechanism comprising:
   a latch bar movably pinned to the tool, said latch bar having a notch adjacent one end for receiving a latch post carried by the tool so that when the latch post is received in the notch, the latch bar prevents the clamping tool from opening; a spring member for urging the notch in the direction of the latch post as the clamping tool is closed, so that the notch of the latch bar engages the latch post an operating member, said spring member contacting the operating member and the latch bar as the clamping tool is operated, thereby causing the spring member to urge the end of the latch bar adjacent to the notch in the direction of the latch post; and an eccentric operating knob movably coupled to the clamping tool for selectively keeping the clamping tool in one of an unlocked mode and a locked mode.

2. A clamping tool having a latch mechanism, the latch mechanism comprising:

a latch bar movably pinned to the tool, said latch bar having a notch adjacent one end for receiving a latch post carried by the tool so that when the latch post is received in the notch, the latch bar prevents the clamping tool from opening; a spring member for urging the notch in the direction of the latch post as the clamping tool is closed, so that the notch of the latch bar engages the latch post an operating member, said spring member contacting the operating member and the latch bar as the clamping tool is operated, thereby causing the spring member to urge the end of the latch bar adjacent to the notch in the direction of the latch post; and a pin movable between one of two available positions for selectively keeping the clamping tool in one of an unlocked mode and a locked mode.

3. A clamping tool comprising:

a first jaw member;

a second jaw member moveably coupled to the first jaw member;

a clamp handle;

an over-the-center linkage operatively coupling the first jaw member, the second jaw member, and the clamp handle so that movement of the clamp handle causes the first jaw member to move toward the second jaw member; and a latch mechanism operatively coupled with the clamp handle so that as the first and second jaw members reach a closed position, the latch mechanism is engaged and prevents the first and second jaw members from opening.

4. The clamping tool of claim 3, wherein the latch mechanism further comprises:

a latch bar pivotally coupled with the clamp handle, the latch bar having a first end and a notch disposed near the first end; and a latch post coupled with the second jaw member so that as the clamp handle moves and causes the first jaw member to move towards the second jaw member, the latch post is received in the notch.

5. The clamping tool of claim 4, wherein the latch mechanism further comprises:

a latch bar spring coupled with the latch bar and biasing the latch bar towards the latch post; and an operating knob disposed adjacent to the latch bar, the operating knob having a first selectable position wherein the operating knob limits movement of the latch bar in a direction away from the latch post and a second selectable position wherein the operating knob pivots the latch bar sufficiently to prevent the latch bar from engaging the latch post.

6. The clamping tool of claim 5, further comprising a link bar forming a portion of the over-the center linkage and positioned so that a second end of the latch bar pivots between the link bar and the operating knob.

7. The clamping tool of claim 6, wherein the latch bar spring is carried by the latch bar and the latch bar spring selectively engages the link bar to bias the latch bar towards the latch post.

8. The clamping tool of claim 4, wherein the latch mechanism further comprises:

a latch bar spring coupled with the latch bar and biasing the latch bar towards the latch post; and a removable pin selectively engageable with a first throughbore disposed adjacent to the latch bar so that when the removable pin is engaged with the first throughbore, the removable pin limits movement of the latch bar away from the latch post and a second throughbore wherein when the removable pin is engaged with the second throughbore, the removable pin pivots the latch bar sufficiently to prevent the latch bar from engaging the latch post.

9. A clamping tool comprising:

a moveable set of jaws;

a latch post coupled with the set of jaws; and a latch bar coupled with the clamping tool and biased to automatically engage the latch post and lock the moveable set of jaws as the moveable set of jaws are caused to close;

a latch bar spring coupled with the latch bar to aid in biasing the latch bar towards the latch post as the moveable set of jaws are caused to close; and an operating knob disposed adjacent to the latch bar, the operating knob having a first selectable position wherein the operating knob limits movement of the latch bar in a direction away from the latch post and a second selectable position wherein the operating knob pivots the latch bar sufficiently to prevent the latch bar from engaging the latch post.

10. The clamping tool of claim 9, further comprising a bar forming a portion of the clamping tool and positioned so that the latch bar pivots between the bar and the operating knob.

11. The clamping tool of claim 10, wherein the latch bar spring is carried by the latch bar and the latch bar spring selectively engages the bar to bias the latch bar towards the latch post.

12. A clamping tool comprising:

a moveable set of jaws;

a latch post coupled with the set of jaws; and a latch bar coupled with the clamping tool and biased to automatically engage the latch post and lock the moveable set of jaws as the moveable set of jaws are caused to close;

a latch bar spring coupled with the latch bar to aid in biasing the latch bar towards the latch post; and a removable pin selectively engageable with a first throughbore disposed adjacent to the latch bar so that when the removable pin is engaged with the first throughbore, the removable pin limits movement of the latch bar away from the latch post and a second throughbore wherein when the removable pin is engaged with the second throughbore, the removable pin pivots the latch bar sufficiently to prevent the latch bar from engaging the latch post.

* * * * *